Jan. 5, 1943.   G. N. WILEMAN   2,307,556
DRIVE MECHANISM FOR SLUDGE COLLECTORS
Filed July 17, 1940
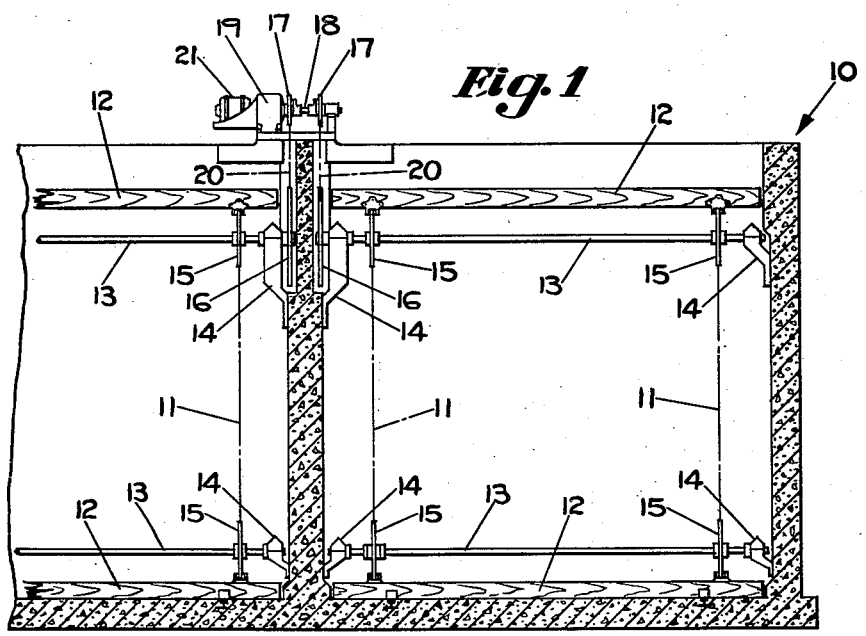
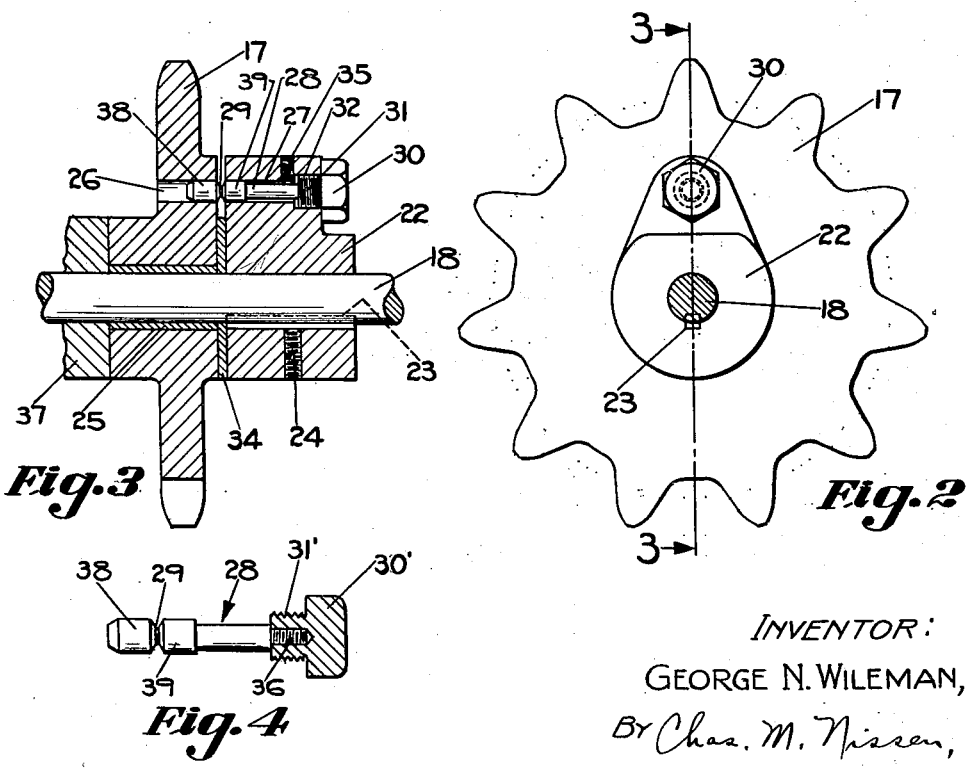
INVENTOR:
GEORGE N. WILEMAN,
By Chas. M. Nissen,
ATTY.

Patented Jan. 5, 1943

2,307,556

UNITED STATES PATENT OFFICE 2,307,556

DRIVE MECHANISM FOR SLUDGE COLLECTORS

George N. Wileman, Columbus, Ohio, assignor to The Jeffrey Manufacturing Company, a corporation of Ohio Application July 17, 1940, Serial No. 345,949

4 Claims. (Cl. 64—28)

This invention relates to a new and improved device incorporated in a chain conveyor drive mechanism.

One object of the invention is to provide means that may be operated to disconnect a conveyor from its driving element and also to shear under predetermined load when in operation.

Another object of the invention is to provide a single means acting as a clutch and a shear pin device the dimensions of which will permit utilization of one or more such devices on a short length of shaft.

Other objects of the invention will appear hereinafter, the novel features and combinations being set forth in the appended claims.

In the accompanying drawing:

Fig. 1 is a cross-sectional view through a pair of sedimentation tanks or basins each of which is provided with a sludge collector mechanism and both of which may be driven by a single power means.

Fig. 2 is an enlarged end view of a driving hub and sprocket connectible by my combination clutch and shear pin device.

Fig. 3 is a sectional view looking in the direction of the arrows 3—3 of Fig. 2.

Fig. 4 is a modified form of pin used as a clutch element and shearing pin.

In the accompanying drawing is shown one application of my invention to a drive for collector apparatus used in sedimentation tanks. The number 10 designates in general a multiple tank or sedimentation basin comprising two compartments each of which is provided with sludge collector mechanism. Since the collector mechanisms are alike, the following description applies to both. Each comprises draft elements 11 carrying scraper conveyor flights 12 at spaced intervals. A plurality of transversely extending shafts 13 are journaled in bearings 14 attached to the side walls of the tank. Each of the shafts 13 carries spaced sprocket wheels 15, 15 about which the draft elements 11 are trained to travel in endless paths.

The adjacent ends of the shafts 13 are provided with sprocket wheels 16, 16 fixed thereto and connected by sprocket chains 20, 20 to the sprockets 17, 17 mounted on the drive shaft 18.

A rotary electric motor 21 is connected through the speed reducer 19 to the drive shaft 18 and the latter may be connected to either or both of the sprockets 17 by means of the disconnectible combination clutch and shear pin device shown in Figs. 2 and 3.

As shown in Figs. 2 and 3, a hub 22 is fixed to the drive shaft 18 by means of a key 23 and a set screw 24. The sprocket 17 is loosely mounted on the shaft 18 with a bushing 25 between the hub of the sprocket 17 and the drive shaft 18.

To transmit power from the electric motor 21 to either or both of the shafts 13, the hubs 22 are connected to the sprocket 17 by means of new and improved combination clutch and shear pin device, it being understood that there are two of such devices, one for each of the sprockets 17.

Encircling the shaft 18 and positioned between the hub 22 and the sprocket 17 is a washer or spacer 34, as shown in Fig. 3, such washer serving to spread or space apart the opposed faces of the hub 22 and the sprocket 17. An aperture 26 in the web of the sprocket 17 may be alined with an aperture 27 of the hub 22, after which the shear pin 28 may be inserted to couple the hub 22 to the sprocket 17 for rotation of the latter with the shaft 18. It should be noted that the shaft 18 is mounted in the journal bearing 37 and therefore the sprocket is confined between the hub 22 and the journal bearing 37 against axial movement along the shaft 18. When the sprocket 17 is coupled to the hub 22 by means of the shear pin 28, the hub and the sprocket rotate as a unit.

To facilitate the shearing of the pin 28, the latter is provided with a neck 29 of reduced diameter. The reduction in diameter of the pin 28 is such that it will shear at this point at a predetermined load which is lower than the breaking point of the other parts of the mechanism.

When two or more sludge collectors in sewage disposal plants are driven from the same power shaft, it is highly desirable to provide readily operable means to disconnect any one of the collectors from the drive shaft. For this purpose the pin 28 is provided with a head 30 either square or hexagon, with a screw-threaded portion 31 adapted to fit the screw threads of a counterbore 32 in the hub 22. That is to say, a cap screw 30, 31 is connected to one end of the shear pin 28 and may be integral with the latter. As shown in Fig. 3, the head 30 is enlarged relative to the screw-threaded portion 31 so as to fit against that portion of the hub 22 surrounding the counterbore 32. By inserting the cap screw and tightening the same against the hub 22, the pin 28 may be securely fixed to the hub 22.

When the cap screw 30, 31 is clamped to the hub 22, the neck portion 29 should be located in the space between the inner face of the hub 22 and the opposed face of the sprocket 17. One size of pin with one size of cap screw attached may be utilized for any number of drives, provided each pin is provided with the neck 29 for location in the space between the hub 22 and the sprocket 17 so as to be shearable at that point under a predetermined load.

In order to lock the cap screw 30, 31, and the pin 28 in predetermined position relative to the hub 22, a set screw 35 may be provided as shown in Fig. 3 in position to engage the shank of the pin 28 which is that portion thereof adjacent the screw threaded portion 31, which shank is connected to head 39 and has a reduced diameter relative thereto. While the set screw 35 may be omitted and the cap screw 30, 31 relied on to clamp the shear pin 28 to the hub 22, I prefer to include the set screw 35 so as to insure the holding of the neck 29 intermediate the opposing faces of the hub 22 and sprocket 17.

Inasmuch as each hub 22 on the drive shaft 18 is provided with a shear pin 28, the sprocket 17 may be disconnected from the hub 22 by removal of the pin 28 or its withdrawal from the aperture 26 into the hub 22 a sufficient distance to uncouple the sprocket 17 from the hub 22. This may be done after loosening the set screw 35 and turning back the cap screw. The set screw 35 may then serve to hold the shear pin 28 to the hub 22 in uncoupling position and in readiness for recoupling to the sprocket 17 whenever desired.

Should the pin 28 shear under load, the sprocket 17 may be rotated to aline the apertures 26 and 27 for renewal of the sheared sections and for replacement by a new pin.

Fig. 4 shows a modification of the shear pin 28 since one end of the shank portion is provided with a screw-threaded extension 36 adapted to be screw-threaded into a recess in the cap screw 30', 31'. In this form the cap screw 30', 31' need not be renewed when the pin 28 shears at 29.

The load at which the pin will shear may vary in accordance with the reduced diameter of the neck 29. That is to say, with a pin 28 of given size and material the neck may have its reduced diameter varied in accordance with the depth of cut. While the pin 28 may project into a recess in the sprocket 17 the aperture 26 is preferred. The heads 38, 39 while fitting snugly in the apertures 26, 27, need not fit very tightly therein as the clamping of the cap screw on the hub 22 may be relied on to hold the heads 38, 39 in place. The set screw 35 holds the cap screw against vibrating loose and if the seating portion of the head 30 becomes worn the set screw 35 alone may be relied on to hold the neck 29 in the space between the hub 22 and the sprocket 17. When the set screw 35 is released partially its inner end may act as an abutment to limit the withdrawal of the pin 28 by being engaged by the shoulder at the right-hand end of the head 39 as viewed in Fig. 3. The set screw 35 may then be tightened to hold the head 38 as well as the head 39 in the bore 27 leaving the sprocket 17 free or disconnected from the motor 21. When the pin 28 is sheared the set screw 35 may be withdrawn sufficiently to release the head 39. The cap screw 30, 31 and the head 30 may then be withdrawn manually. Now by turning the sprocket 17 to bring the apertures 26 and 27 into registry a tool may be inserted into the aperture 27 to drive the sheared head 38 out of the aperture 26 preparatory to inserting a new and complete pin 28 either of the form shown in Fig. 3 or of the form shown in Fig. 4, to connect the hub 22 to the sprocket 17 as shown in Fig. 3.

Obviously those skilled in the art may make various changes and modifications in the details and arrangements of parts without departing from the spirit and scope of the invention as defined by the claims hereto appended, and I wish therefore not to be restricted to the precise construction herein disclosed.

Having thus described and shown an embodiment of my invention what I desire to secure by Letters Patent of the United States is:

1. Drive mechanism comprising the combination with a driving shaft, of a hub secured thereto to rotate therewith, a sprocket loosely mounted on said shaft, a spacer between said hub and said sprocket, a shear pin having a neck of reduced diameter, said shear pin being adapted to be inserted in alined openings in said hub and sprocket, and means for holding said pin in such relation with said hub as to keep said neck in the plane of said spacer and between the hub and the sprocket.

2. Drive mechanism comprising the combination with a driving element, of a driven element, a shear pin for coupling said elements, an abutment between the ends of said shear pin, means at one end of said shear pin for securing the latter to one of said elements in coupling position, and a set screw on the last-named element in position to be engaged by said abutment when the shear pin is withdrawn from coupling position to locate said shear pin in non-coupling position, said set screw being also adapted to engage said shear pin to hold the same in non-coupling position.

3. Drive mechanism comprising the combination with a driving element, of a driven element, a double headed shear pin having a shank of reduced diameter to enable the inner head to provide an annular abutment, a head secured to said shank and screw-threaded into one of said elements to hold the shear pin in coupling position, and a set screw on said last-named element in position to engage said shank to hold the shear pin in non-coupling position, said abutment being adapted to engage the set screw when the latter is released from said shank and the shear pin moved to non-coupling position, such abutment and set screw constituting limit stop mechanism serving to locate the shear pin in non-coupling position.

4. As an article of manufacture, a shear pin comprising the combination with a pair of heads connected by a neck of reduced diameter, a shank connected to one of said heads and having a reduced diameter relative thereto, and an enlarged head secured to that end of said shank remote from said pair of heads.

GEO. N. WILEMAN.